No. 885,632. PATENTED APR. 21, 1908.
A. C. MICHAEL.
WATERING TROUGH.
APPLICATION FILED SEPT. 25, 1907.
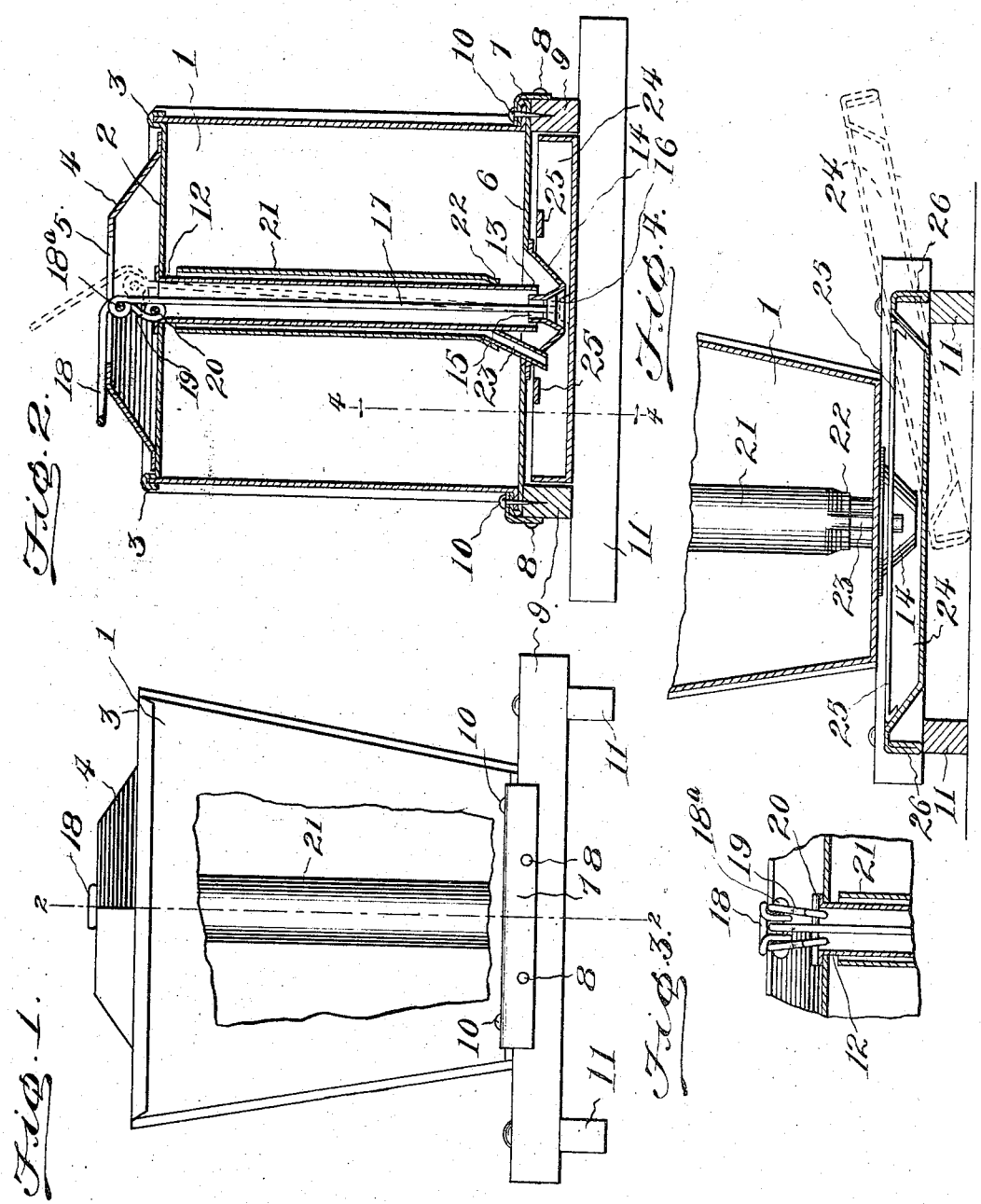
Witnesses
J. T. L. Wright
Inventor
Anceal C. Michael,
By Victor J. Evans
Attorney

UNITED STATES PATENT OFFICE.

ANCEAL C. MICHAEL, OF FLORA, INDIANA, ASSIGNOR OF ONE-HALF TO WILLIAM B. FISHER, OF FLORA, INDIANA.

WATERING-TROUGH.

No. 885,632.      Specification of Letters Patent.      Patented April 21, 1908.

Application filed September 25, 1907. Serial No. 394,535.

REISSUED

*To all whom it may concern:*

Be it known that I, ANCEAL C. MICHAEL, a citizen of the United States, residing at Flora, in the county of Carroll and State of Indiana, have invented new and useful Improvements in Watering-Troughs, of which the following is a specification.

This invention relates to watering troughs designed for the purpose of supplying fresh water to poultry and small stock, and one of the principal objects of the same is to provide a drinking fountain of that type which automatically discharges water from a tank to a trough and maintains a constant supply of water in the trough, in which provision will be made for conveniently refilling the water tank, and for providing means for replacing the water fed from the tank by air to support the flow.

Another object of my invention is to provide a water tank of such contour as will shade the water trough.

Still another object of my invention is to simplify and to render more efficient in use, drinking fountains of the character referred to.

These and other objects may be attained by means of the construction illustrated in the accompanying drawings, in which Figure 1 is a side elevation of a watering trough made in accordance with my invention, a portion of the side being broken away to illustrate the interior thereof. Fig. 2 is a central vertical section on the line 2—2 of Fig. 1. Fig. 3 is a detail section taken through the upper portion of the tank. Fig. 4 is a vertical section on the line 4—4 of Fig. 2 looking in the direction indicated by the arrows.

Referring to the drawing for a more specific description of my invention the numeral 1 designates a water tank, the opposite sides of which converge toward the bottom as shown in Fig. 1 in order to shade the water trough. The top 2 of the tank is provided with flanges 3 bent down over the upper edge of the tank 1 and secured on the upper surface of the top 2 is a housing 4 provided with a central opening 5. The bottom 6 of the tank has its outer edge bent around the outwardly turned flange of the tank body and to secure said bottom to the tank an angle plate 7 is provided, said angle plate being connected by fastenings 8 to the supporting bars 9. The inwardly extending flanges of the angle plate are secured to the bars 9 by means of the fastenings 10, said fastenings passing through the outwardly turned flanges on the body 1 and the outer edges of the bottom 6 as shown more clearly in Fig. 2.

The bars 9 are supported upon cross bars 11. Connected centrally to the top 2 is a depending tube 12, the lower end 13 of which is open and is disposed within a cup 14 secured to the bottom 6 and depending therefrom. The cup 14 has an upwardly extending nozzle 15. A stopper 16 connected to the lower end of the rod 17 closes the nozzle 15. Connected to the upper end of the rod 17 is a lever 18, said lever having a member 19 pivotally connected to a bar 18ª and pivoted to a cross bar 20 supported upon the top 2 of the tank. By swinging the lever into the position shown in the dotted lines in Fig. 2 the stopper 16 moves outward from the nozzle 15.

A tube 21 surrounds the tube 12, the upper end of said tube 21 terminating at a slight distance below the top 2 of the tank. The lower end of the tube 21 is bent inwardly at 22 and secured to the tube 12. An outlet tube 23 is secured between the tubes 12 and 21, said tube extending through the cup 14 to admit air to the tank 1. The trough 24 is provided with cross slats 25 and the outer edges of the trough are bent downward and doubled as at 26, said flanges 26 resting on the cross bars 11. As shown in Fig. 4 in dotted lines the trough 24 is removable so that it can be readily cleaned.

The operation of my invention may be briefly described as follows: When it is desired to fill the tank 1, the stopper 16 is drawn upward by the lever 18, the water then being poured into the opening 5 will pass down the tube 12 into the cup 14 and thence upward in the tank to the required height. When the stopper 16 is moved downward in the nozzle 15 the water will overflow the top of said nozzle and discharge into the trough 24. When the water in the trough 24 rises to a point above the lower end of the tube 23, air to support the flow of water will be shut off and hence the water in trough 24 will only reach a point just above the lower end of said tube 23. When the water is used from the trough 24 air entering the tube 23 will pass up to the upper end of the tank and thus permit water to flow over the top of the nozzle 15 into said trough.

From the foregoing it may be obvious that a device made in accordance with my invention will feed water automatically from the tank to the trough and that the trough may be readily removed whenever it is required to clean the same.

Having thus fully described the invention what is claimed as new is:

1. A drinking fountain, comprising a water tank, a tube extending downward from the top of the tank, an air tube surrounding said downwardly extending tube and connected thereto at its lower end, a cup secured to the bottom of the tank and provided with a nozzle, an air tube communicating with the first mentioned air tube and extending through said cup and a removable trough under the bottom of the tank.

2. A drinking fountain, comprising a water tank, a filling tube extending from the top of said tank below the bottom thereof, a cup secured to the bottom of the tank and provided with a nozzle, a rod a stopper connected to said rod extending through said tube and said rod provided at its upper end with an eccentric operating lever.

3. A drinking fountain, comprising a water tank, an inner tube connected to and extending from the top of said tank, an air tube secured to and surrounding said inner tube and terminating at its upper end immediately below the top of the tank, a cup secured to the bottom of the tank, said cup having an upwardly extending nozzle, a stopper fitted to said nozzle means for operating said stopper to open and close said nozzle, a removable water trough below said cup, an air tube communicating with the first mentioned air tube and extending through said cup.

4. In a drinking fountain, the combination of a filling tube, a tank, an air tube secured to and surrounding said filling tube, a cup provided with a nozzle, a stopper, means for actuating said stopper to open and close said nozzle, an air tube communicating with the first mentioned air tube and extending through said cup, and a removable water trough below said cup.

In testimony whereof I affix my signature in presence of two witnesses.

ANCEAL C. MICHAEL.

Witnesses:
ALVIE B. HOUZE,
CHARLES E. SMITH.